United States Patent [19]

Scholz

[11] Patent Number: 5,985,095
[45] Date of Patent: *Nov. 16, 1999

[54] PROCESS FOR REMOVING CONTAMINANTS FROM PAPER PULP USING A DEINKING COMPOSITION COMPRISING PRESSURE-SENSITIVE-ADHESIVE

[75] Inventor: William F. Scholz, Altadena, Calif.

[73] Assignee: Avery Dennison Corporation, Pasadena, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/870,958

[22] Filed: Jun. 6, 1997

[51] Int. Cl.$^6$ ................................................ D21C 5/02
[52] U.S. Cl. ........................................... 162/5; 162/4
[58] Field of Search ................................ 162/4, 5, 8

[56] References Cited

U.S. PATENT DOCUMENTS

| | | | |
|---|---|---|---|
| 3,577,398 | 5/1971 | Pace et al. | 260/85.3 |
| 3,692,756 | 9/1972 | St. Cyr | 260/80.7 |
| 3,764,460 | 10/1973 | Miyamoto et al. | 162/5 |
| 3,872,064 | 3/1975 | Pace et al. | 260/80.7 |
| 3,932,328 | 1/1976 | Korpman | 260/27 |
| 4,076,578 | 2/1978 | Puddington et al. | 162/5 |
| 4,080,348 | 3/1978 | Korpman | 260/27 |
| 4,104,327 | 8/1978 | Inoue et al. | 260/876 |
| 4,125,665 | 11/1978 | Bemmels et al. | 428/352 |
| 4,288,480 | 9/1981 | Grzywinski et al. | 428/40 |
| 4,325,770 | 4/1982 | Korpman | 156/230 |
| 4,643,800 | 2/1987 | Maloney et al. | 162/5 |
| 4,698,133 | 10/1987 | Moreland | 162/5 |
| 4,781,794 | 11/1988 | Moreland | 162/199 |
| 4,820,746 | 4/1989 | Rice et al. | 522/127 |
| 4,822,452 | 4/1989 | Tse et al. | 162/146 |
| 4,886,575 | 12/1989 | Moreland | 162/5 |
| 4,923,566 | 5/1990 | Shawki et al. | 162/135 |
| 4,995,944 | 2/1991 | Aston et al. | 162/199 |
| 5,080,759 | 1/1992 | Buzby et al. | 162/158 |
| 5,102,733 | 4/1992 | Zawadzki | 428/343 |
| 5,112,889 | 5/1992 | Miller et al. | 524/77 |
| 5,182,323 | 1/1993 | Russell | 524/322 |
| 5,213,661 | 5/1993 | Naddeo et al. | 162/6 |
| 5,266,166 | 11/1993 | Dreisbach et al. | 162/199 |
| 5,281,348 | 1/1994 | Letscher | 252/60 |
| 5,281,358 | 1/1994 | Urushibata et al. | 252/174.21 |
| 5,290,842 | 3/1994 | Sasaki et al. | 524/271 |
| 5,292,403 | 3/1994 | Dreisbach et al. | 162/158 |
| 5,300,194 | 4/1994 | Welkener et al. | 162/199 |
| 5,302,649 | 4/1994 | Sasaki et al. | 524/274 |
| 5,316,621 | 5/1994 | Kitao et al. | 162/4 |
| 5,326,644 | 7/1994 | Scholz et al. | 428/514 |
| 5,368,694 | 11/1994 | Rohlf et al. | 162/199 |
| 5,415,739 | 5/1995 | Furman, Jr. et al. | 162/158 |
| 5,614,577 | 3/1997 | Sasaki et al. | 524/274 |
| 5,618,861 | 4/1997 | Hlivka et al. | 524/55 |
| 5,663,228 | 9/1997 | Sasaki et al. | 524/271 |

FOREIGN PATENT DOCUMENTS

| | | |
|---|---|---|
| 0238135 | 9/1987 | European Pat. Off. . |
| 0656410 | 6/1995 | European Pat. Off. . |
| 2080354 | 3/1982 | United Kingdom . |
| WO9710310 | 3/1997 | WIPO . |

OTHER PUBLICATIONS

Scholz, W. "Pressure Sensitive Adhesives", Progress in Paper Recycling, pp. 71–73, Nov. 1994.
A.E. Barrett, Laboratory Procedures to Evaluate the Separability of Hot–Melt Contaminants, Progress in Paper Recycling, pp. 47–41 (Aug. 1994).
C.S. Chou, Repulpability of Adhesives, Progress in Paper Recycling, pp. 76–81 (Feb. 1994).
Hawley's Condensed Chemical Dictionary, Eleventh Ed., Van Nostrand Reinhold, New York, pp. 932,938 (1986).
Rubber World Magazine's Blue Book, 1987 edition, by Lippincott & Peto Inc.—pp. 440–444, pp. 451–452, pp. 471–474.
W.F. Scholz, Impact of Adhesives on Paper Recycling, Progress in Paper Recycling, 4, No. 1:71–73 (Nov. 1994).
L.D. Ferguson, A Review of Floatation Deinking Technology, Progress in Paper Recycling, 1, No. 1:17–23 (Nov. 1991).
E.M. Wise, Hot Melt Adhesive Removal in Centrifugal Cleaners, TAPPI Pulping Conference Notes, 1993, 605–617.
W. F. Scholtz, Recyclable Pressure Sensitive Adhesives, TAPPI Pulping Conference Notes, 1993, 501–506.
N. R. Srivatsa, Impact of Adhesives on Paper Recycling, Progress in Paper Recycling, 4, No. 1:63–64 (Nov. 1994).
M.R. Doshi, "Additives to Combact Sticky Contaminants in Secondary Fibers," TAPPI Recycling Paper: From Fiber to Finished Product, pp. 519–527 (1991).
T.J. Fogarty, "Cost–Effective, Common Sense Approach to Stickies Control", TAPPI J., vol. 76, No. 3 (Mar. 1993).
Wingtack™ 10 Liquid Tackifying Resin, Good Year Chemical, pp. WT–3–1 through WT–3–4.
Solubility and Compatibility of Wingtack™ Resins, WT–4–1 through WT–4–4.
Material Safety Data Sheet for Wingtack™ Plus.
Material Sheet Data Sheet for Wingtakc™ 10.
Material Sheet Data Sheet for Wingtack™ 95.
Wingtack™ 95 Liquid Tackifying Resin, Good Year Chemical, date stamped Nov. 6, 1997.
Hercules "Selection Guide for Hercules Hydrocarbon Resins," (31 pages).
Adhesives and Sealants Industry Sector, "Escorez™ Tackifiers for Adhesives & Sealants"by Exxon Chemical, (pp. 1–3).

(List continued on next page.)

*Primary Examiner*—Dean T. Nguyen
*Attorney, Agent, or Firm*—Christie, Parker & Hale, LLP

[57] ABSTRACT

A tackified, mixed rubber, hot melt PSA deinking composition and an improved process for removing inks and other contaminants from printed wastepaper are provided. A preferred deinking composition contains a mixture of SB and SIS rubbers, tackified with at least one hydrocarbon resin tackifier and at least one rosin-based tackifier. In an improved deinking or recycling process, the novel composition is added to a paper slurry, either directly or as PSA-coated paper or label stock, and significantly reduces the number of contaminants that remain after screening and forward cleaning.

13 Claims, No Drawings

OTHER PUBLICATIONS

*Handbook of Adhesives,* Third Ed., Van Nostrand Reinhold, New York, pp. 641–663 (1989).

Wingtack™ 86 Tech Facts, "Hot Melt and Pressure Sensitive Adhesive Properties," by Good Year Chemical, Form 588500–3/93, 1 page.

Wingtack™ 86 Tech Facts, "Description and Physical Properties," by Good Year Chemical, Form 588600–3/93, 2 pages.

Wingtack™ Extra Tech Facts, by Good Year Chemical, Form 588400–3/93, 2 pages.

Wingtack™ Plus Tech Facts by Good Year Chemical, Form 588300–3/93, 2 pages.

Wingtack™ 10 Tech Facts by Good Year Chemical, Form 588800–3/93, 2 pages.

Wingtack™ 95 Tech Facts by Good Year Chemical, Form 588900–3/93, 2 pages.

Wingtack™ Tech Facts, Solubility and Compatibility of Wingtack Resins, by Good Year Chemical, Form 58900–3/93.

Handbook of Pressure–Sensitive Adhesive Technology (Copyright 1982 by Van Nostrand Reinhold Company Inc.), the face page, Table of Contents pages, and pages 220–223 and 229–234.

PROCESS FOR REMOVING CONTAMINANTS FROM PAPER PULP USING A DEINKING COMPOSITION COMPRISING PRESSURE-SENSITIVE-ADHESIVE

FIELD OF THE INVENTION

This invention relates to deinking compositions and processes for removing contaminants from paper pulp.

BACKGROUND OF THE INVENTION

For decades, paper fiber contaminated with inks, adhesives, dirt and other contaminants has been a persistent problem to the recycling industry. Impact inks are particularly difficult to remove, and result in brightness losses in recycled paper products. During recycling, tacky materials such as pressure-sensitive and non-pressure-sensitive adhesives and the like contribute to the formation of what are commonly referred to in the trade as "stickies." Stickies tend to deposit on the felts, wires, drier cans and other paper machine parts, and disrupt the smooth operation of paper machines. They also degrade the functional and cosmetic properties of paper products made with recycled paper fiber.

Although stickies are introduced into the wastepaper stream from many different sources, the predominant contributors are pressure-sensitive adhesives (PSAs), non-pressure-sensitive binding and packaging adhesives, paper coatings, waxes, and thermoplastic non-impact print toners. Stickies and other contaminants can be removed from paper pulp using physical and chemical means, but their inherent physical properties reduce the overall efficiency of these processes.

Printed wastepaper is deinked and recycled into pulp by a combination of pulping, screening, cleaning (forward and flow-through), floatation, washing and solids concentrating process steps. The sequence and redundancy of each step in the process varies at each mill and depends upon the nature of the incoming wastepaper stream and the product specifications of the outgoing pulp. The screening operation is the preferred operation for removing contaminants, because it enables the contaminants to be permanently removed from the pulp as solid materials early in the process. This simplifies subsequent processing of the pulp.

Unfortunately, the complete removal of PSA contaminants from paper fiber is complicated by several inherent properties common to all normally self-adhesive materials. Under conditions of shear, as are encountered in the pulping operation and during the transfer of pulp between deinking steps, conventional PSAs fragment or disperse into small to moderate size particles (about 100 to 5000 microns in diameter). Such particles can easily deform with heating and/or pressure, allowing the contaminants to pass through conventional screens and filtering equipment. Such deformation is quite prevalent under the high pressure drops and high temperatures (>37° C.) common to commercial deinking operations.

The smooth operation of subsequent washing and floatation operations is hindered by the presence of the fragmented or dispersed, tacky globules, where the globules are dispersed or fragmented PSA particles. It is believed that the globules are in the form of discrete particles after contact with water. The particles' inherent tackiness causes them to adhere to other contaminants and to paper fibers, and further complicates the recycling process. In addition, many PSA products have densities between 0.95 and 1.05 $g/cm^3$, reducing the efficiency of removal with centrifugal cleaners.

SUMMARY OF THE INVENTION

Remarkably, it has now been discovered that certain novel, PSAs based on tackified mixtures of styrene-isoprene-styrene and styrene-butadiene rubbers actually promote removal of paper pulp containments when added to recycling or deinking operations. According to a preferred embodiment of the invention, a deinking composition is provided, and comprises a PSA, preferably a tackified mixture of styrene-butadiene and styrene-isoprene-styrene rubbers, more preferably an adhesive mixture of styrene-butadiene and styrene-isoprene-styrene rubbers, at least one hydrocarbon resin tackifier, and at least one rosin-based tackifier, which promotes removal of paper pulp contaminants when added to a slurry of paper.

The new, tackified, mixed rubber PSAs are cohesively strong and have a greatly reduced tendency to disperse into small particles during high shear pulping. They also have a reduced tendency to deform and pass through pressure screens or slots during the recycling process, even under high temperatures and pressures. The compositions are useful as PSA materials in label and tape applications and as deinking compositions for the recycling of printed wastepaper and films.

Removal of contaminants is accomplished through the inherent tack of the tackified, mixed rubber product. Contaminants, such as laser and impact inks, other adhesives (both pressure-sensitive and non-pressure sensitive, non-repulpable papers, small plastic materials and the like, permanently adhere to the outer surface of globules of the tackified rubber mixture, making their removal possible with the removal of the globules.

The new compositions are generally introduced into deinking operations via their use as labels and tapes, or as additives to the paper pulping process, either as solids, organic solvent-based solutions, or aqueous dispersions or emulsions. Aqueous-based formulations are likely to enjoy wide appeal, as they avoid the environmental concerns associated with solvent-based formulations.

DETAILED DESCRIPTION

The present invention provides novel compositions that promote removal of contaminants from paper in printed wastepaper deinking operations (also referred to as paper recycling operations), and an improved deinking process. As used herein, "deinking operations" include such processes as removal of inks, stickies and other contaminants, such as small pieces of paper, from the in-coming wastepaper stream. In a preferred embodiment, a deinking composition comprises a PSA, which can be added to a paper slurry either as a solid, dissolved in an organic liquid, or emulsified in water.

The PSA comprises a tackified blend or mixture of styrene-butadiene (SB) and styrene-isoprene-styrene (SIS) rubbers. Preferred rubbers are synthetic di-block and tri-block styrene copolymers, for example, Solprene™ 1205, a low molecular weight, linear, SB block copolymer with a Mooney viscosity of from 42 to 52 (ML 1+4 @ 100° C., ASTM D-1646), manufactured by Housemex (Memphis, Tenn.), and Vector™ 4111D, a 100% triblock SIS copolymer containing 18% styrene, with a number average molecular weight of about 135,000, manufactured by Exxon Chemicals (Houston, Tex.).

Together, the SB and SIS rubbers preferably comprise at least about 30%, more preferably, from about 30% to about 45%, by weight of the adhesive, with a preferred SIS:SB ratio less than or equal to about one.

The SB and SIS rubbers are tackified with at least one hydrocarbon resin tackifier and at least one rosin-based tackifier to provide a tackified, mixed rubber PSA having a high cohesive strength. Nonlimiting examples of tackifiers useful in the practice of the invention include (a) hydrocarbon resin tackifiers that are normally liquid at room temperature (e.g., about 20 to 25° C.), for example Escorez™ 2520 (manufactured by Exxon Chemicals), a petroleum-based, liquid tackifying resin made from a mixture of low molecular weight aliphatic and aromatic hydrocarbons having an average of about 5 to 6 carbon atoms per molecule, with a ring and ball softening point of about 17° to 23° C., a glass transition temperature, $T_g$ (midpoint, measured by differential scanning calorimetry, DSC) of about –15° C., and a number average molecular weight, $M_N$, of about 430 (measured by gel partitioning chromatography, GPC); (b) hydrocarbon resin tackifiers that are normally solid at room temperature, for example, Escorez™ 1310LC, manufactured by Exxon Chemicals, a petroleum-based tackifying resin having a ring and ball softening point of about 93° C. (softening points above 90° C. are preferred for solid resins), $T_g$ (midpoint, by DSC) of about 45° C., $M_N$ (GPC) of about 1350, viscosity at 177° C. of about 300 cps, and wax cloud point of about 95° C.; and (c) rosin-based tackifiers, for example Permalyn™ 6110, manufactured by Hercules Inc. (Wilmington, Pa.), a polyethylene polyester tackifying resin made from distilled gum rosin.

Preferably, the ratio of hydrocarbon resin tackifier(s) to rosin-based tackifier(s) is about 5 to 1. It is also preferred to employ both a liquid at room temperature hydrocarbon resin and a solid at room temperature hydrocarbon resin, in a preferred ratio of about 1:1.

In order to facilitate their use in a variety of tape and label applications, the PSA compositions provided by the present invention are formulated with certain physical properties and performance characteristics in mind, including high viscosity (e.g., ≧70 Pas), good room temperature shear to stainless steel (e.g., ≧120 min.), and good loop tack to corrugated board, e.g., at least about 175 N/m (1 lb./in.). With these parameters, a multivariable design space for the formulation of PSA deinking compositions is created. In one example, the formulation has, on an approximate basis, based on the weight of the adhesive composition, 11 to 28% SB rubber; 11 to 28% SIS rubber; 10 to 20% first hydrocarbon resin tackifier (solid at room temperature); 25 to 40% second hydrocarbon resin tackifier (liquid at room temperature); and 10 to 25% rosin-based tackifier; with the ratio of SIS to SB rubbers ≦1, and a total rubber content of from about 32 to 42%.

The PSAs are conveniently prepared by blending together the SB and SIS rubbers, hydrocarbon resin tackifier(s) and rosin-based tackifier(s), using a suitable mixing apparatus (for example, a sigma blade mixer). It is believed that the resulting viscoelastic solid material can be used as a deinking additive directly, or first dissolved in a suitable organic solvent—or dispersed or emulsified in water—and then used as a deinking additive. Nonlimiting examples of suitable organic solvents include toluene, heptane, d-limonene, d-limone derivatives, and the like, with d-limonene being preferred. Solvent blends are also suitable. Nonlimiting examples of suitable surfactants include alkyl phenols (e.g. nonyl phenol), alkyl sulfates (e.g., lauryl sulfate), and the like.

Addition of even 1% by weight of the tackified, mixed rubber, PSA deinking composition to a slurry of paper or paper pulp greatly improves the paper deinking and recycling process. Preferably, the composition is added early on, during the pulping operation. The inherent tack of the product facilitates removal of inks and other pulp contaminants, which permanently adhere to the outer surface of the tackified product, making their removal possible with the removal of the product.

Removal is primarily accomplished in two different steps, screening and forward cleaning. Screening is possible because of the inherent properties of the deinking composition, notably, high viscosity, low deformability, and good tack. In forward cleaning, a centrifuge separates heavy particles (having a specific gravity greater than 1.05) from light particles (sp. gravity ≦1.05). In this operation, the deinking composition appears to improve the removal of contaminants, particularly inks, because the apparent density of adhesive-bound ink particles is above the critical level required for removal. Indeed, most laser printer inks contain ferric oxide, which has a high density, and the new deinking composition facilitates removal of such inks.

With the tackified, mixed rubber, PSA compositions described herein, all manner of tapes and labels can be made, using well known techniques. Thus, a PSA composition can be directly applied to a paper face stock (less preferably, a film face stock), or coated on a release liner using a hot melt coater and then laminated to a paper (or film face stock). The resulting construction can be die-cut, matrix stripped, and subjected to other converting operations, all well known in the art. Paper face stock tapes and labels bearing the new PSA are much more readily recycled than conventional adhesive-coated products, and, in addition actually facilitate removal of inks and other contaminants when processed in recycling operations.

EXAMPLES

Example 1

A tackified, mixed rubber, hot melt PSA deinking composition was prepared by blending together sufficient amounts of SB and SIS rubbers (Solprene™ 1205 and Vector™ 411D), liquid hydrocarbon tackifier (Escorez™ 2520), solid hydrocarbon tackifier (Escorez™ 1310LC) and rosin-based tackifier (Permalyn™ 6110) to make, e.g., about 2.2 kg (1 lb.) of material, using a one liter sigma blade mixer. Relative amounts of components are listed in Table 1.

TABLE 1

Example 1 - Weight Percent of PSA Components

| Component Description | Product Name | Weight Percent |
| --- | --- | --- |
| SB rubber | Solprene™ 1205 | 20.9 |
| SIS rubber | Vector™ 4111D | 20.9 |
| Liquid tackifying resin | Escorez™ 2520 | 25.0 |
| Solid tackifying resin | Escorez™ 1310LC | 23.2 |
| Rosin-based tackifier | Permalyn™ 6110 | 10.0 |

Total rubber content (SB+SIS) of Example 1 was 41.8% by weight, and the ratio of SIS to SB rubbers was one to one.

Adhesive performance of the hot melt PSA of Example 1 was measured and compared to that of Control 1, a standard, hot melt, rubber-based PSA (S246, sold by Avery Dennison Corporation (Pasadena, Calif.)). Adhesive, laminated constructions were made by coating each adhesive on a silicone release liner using a hot melt coater (coat weight of about 20±5 g/m$^2$) and laminating to a 50 pounds per ream paper face stock. The constructions were tested for 180° peel, loop tack and room temperature shear (RTS) from stainless steel.

Loop tack measurements were made using approximately 25 mm (1 in.) wide strips, with stainless steel as the substrate, at a withdraw rate of about 305 mm/min. (12 in./min.), according to standard test 1994 TLMI Test L-IB2, TLMI Loop Tack Test by the Tag and Label Manufactures Institute, Inc. (TLMI), using an Instron Universal Tester, Model 4501, from Instron (Canton, Mass.). Loop tack values were taken to be the highest measured adhesion value observed during the test.

To measure peel adhesion, an identical adhesive laminate construction was die-cut into about 25×152 mm (1×6 in) strips. The strips were then applied to diacetone/alcohol-washed 102 mm (4 in) brightly annealed, highly polished, stainless steel test panels using three passes of a 9.9 kg (4.5 lb.), 5.45 pli 65 shore "A" rubber-faced roller. The samples were then conditioned for 24 hours in a controlled environment testing room maintained at 21° C. (70° F.) and 50% relative humidity. After conditioning, the samples were analyzed using an Instron Universal Tester according to a modified version of the standard tape method Pressure-Sensitive Tape Council, PSTC-1 (rev. 1992), Peel Adhesion for Single Coated Tapes 180° Angle where the peel angle was 90°. A load cell linked to a computer was used to estimated the value reported in Table 2.

Shear adhesion was measured utilizing ASTM D-3654-78 and D-1000-68 and PSTC (Pressure-Sensitive Tape Council) Test #7, 6th Edition using 13 mm×13 mm, (0.5 in×0.5 in) samples, and a 500 g weight, after 0 min. dwell at 70° C. and/or 100° C.

The results of adhesive performance testing are presented in Table 2. For each adhesive characteristic, three tests were conducted, and the results averaged.

TABLE 2

Adhesive Performance on Stainless Steel

| Sample | 180° Peel (N/m) | Loop Tack (N/m) | RTS (min) |
|---|---|---|---|
| Example 1 | 1,246 | 852 | 1,102 |
| Control 1 | 925 | 676 | 333 |

As seen in Table 2, Example 1 had three times the room temperature shear of the control, and better loop tack and 180° peel, making it a useful PSA for a variety of applications.

To evaluate the performance of Example 1 as a deinking composition, printed wastepaper recycling trials were conducted. Adhesive-contaminated, printed wastepaper containing 50% impact and 50% laser inks was pulped for 45 min. at 165° F., pH 11, at 10% consistency. 0.075% by weight of the hot melt PSA of Example 1 was added to the pulper as an adhesive-coated label. Additionally, a small amount (15 lb/ton of paper) of surfactant, CDI-225, available from Betz Dearborn, Inc. (Langhorne, Pa.) was added. The pulp was coarse screened (1.27 mm (0.05 in) diameter holes), fine screened (150 μm (0.006 in.) wide slots), and passed through a high density contaminant removal forward cleaner. Although most paper deinking mills use redundant processing, in this test pulp was processed through each operation only once.

After each operation (course screening, fine screening and forward cleaning), 10 handsheets of paper were made and analyzed for contaminant particles, using a PIA2000 particulate image analyzer, which detects contaminant particles approximately 0.04 m² or larger in size. Particle counts and ppm (average particle area, mm², divided by total paper area, mm²) after each operation are presented in Table 3. The data represents the average for 10 handsheets.

TABLE 3

Contaminant Removal Effectiveness

| Deinking Operation | Particle Count | PPM |
|---|---|---|
| Pulping | 8363 | 1977 |
| Course screening | 9290 | 1863 |
| Fine screening | 4188 | 300 |
| Forward cleaning | 613 | 23 |

The recycling trials readily demonstrate the effectiveness of the tackified, mixed rubber PSA as a deinking agent. After a single pass through three recycling steps (course screening, fine screening and forward cleaning), contaminant particle counts dropped by a factor of 10, on average, and the average particle area per paper area dropped by almost two orders of magnitude. Close examination of the contaminant particles revealed an adhesive core uniformly surrounded by contaminants, including both laser and impact inks—a remarkable and unexpected result, since impact inks are not usually susceptible to collection via chemical addition.

What is claimed is:

1. In a process for removing contaminants from printed wastepaper, the improvement comprising:

adding to a printed paper or printed paper pulp slurry a deinking composition comprising a pressure-sensitive adhesive that promotes removal of contaminants from paper pulp wherein the pressure-sensitive adhesive comprises a tackified mixture of styrene-butadiene and styrene-isoprene-styrene rubbers.

2. An improved process as recited in claim 1, wherein the styrene-butadiene and styrene-isoprene-styrene rubbers comprise from about 30 to about 45% by weight of the deinking composition.

3. An improved process as recited in claim 1, wherein the ratio of styrene-isoprene-styrene to styrene-butadiene rubbers is less than or equal to about one.

4. An improved process as recited in claim 1, wherein the tackified mixture contains at least one hydrocarbon resin tackifier and at least one rosin-based tackifier.

5. An improved process as recited in claim 4, wherein the ratio of hydrocarbon resin tackifier(s) to rosin-based tackifier(s) is about 5 to 1.

6. An improved process as recited in claim 4, wherein the hydrocarbon resin tackifier comprises both a first, liquid at room temperature hydrocarbon resin tackifier, and a second, solid at room temperature hydrocarbon resin tackifier.

7. An improved process as recited in claim 6, wherein the solid tackifier has a ring and ball softening point above 90° C.

8. An improved process as recited in claim 6, wherein the ratio of liquid to solid hydrocarbon resin tackifiers is about 1 to 1.

9. An improved process as recited in claim 1, wherein the deinking composition is dissolved in an organic solvent or dispersed or emulsified in water.

10. An improved process as recited in claim 1, wherein the pressure-sensitive adhesive comprises, on a percent by weight of the composition basis, from about 11 to about 28% styrene-butadiene rubber;

from about 11 to about 28% styrene-isoprene-styrene rubber;

from about 10 to about 20% first hydrocarbon resin tackifier, which is solid at room temperature;

from about 25 to about 40% second hydrocarbon resin tackifier, which is liquid at room temperature; and from about 10 to about 25% rosin-based tackifier; wherein the ratio of styrene-isoprene-styrene to styrene-butadiene rubbers is less than or equal to about 1, and the total amount of rubbers ranges from about 32 to about 42%.

11. A process as recited in claim 10, wherein the first hydrocarbon resin tackifier has a ring and ball softening point above about 90° C.

12. A process as recited in claim 10, wherein the second hydrocarbon resin tackifier comprises a petroleum-based resin made from a mixture of low molecular weight hydrocarbons having an average of about 5 to 6 carbon atoms per molecule.

13. A process as recited in claim 10, wherein the rosin-based tackifier is made from distilled gum rosin.

* * * * *